US010518408B2

(12) United States Patent
Wang et al.

(10) Patent No.: US 10,518,408 B2
(45) Date of Patent: Dec. 31, 2019

(54) ROBOT JOINT STRUCTURE (71) Applicant: UBTECH Robotics Corp., Shenzhen (CN)

(72) Inventors: Yang Wang, Shenzhen (CN); Youjun Xiong, Shenzhen (CN); Wenquan Shu, Shenzhen (CN)

(73) Assignee: UBTECH ROBOTICS CORP., Shenzhen (CN)

(*) Notice: Subject to any disclaimer, the term of this patent is extended or adjusted under 35 U.S.C. 154(b) by 518 days.

(21) Appl. No.: 15/296,084

(22) Filed: Oct. 18, 2016

(65) Prior Publication Data
US 2017/0341226 A1 Nov. 30, 2017

(30) Foreign Application Priority Data

May 27, 2016 (CN) .................. 2016 2 0505834 U (51) Int. Cl.
*B25J 9/12* (2006.01)
*B25J 9/08* (2006.01)
*B25J 17/00* (2006.01)

(52) U.S. Cl.
CPC . *B25J 9/12* (2013.01); *B25J 9/08* (2013.01); *B25J 17/00* (2013.01); *Y10S 901/23* (2013.01); *Y10S 901/28* (2013.01)

(58) Field of Classification Search
CPC ...... B25J 9/12; B25J 9/08; B25J 17/00; Y10S 901/28; Y10S 901/23
See application file for complete search history.

(56) References Cited

U.S. PATENT DOCUMENTS

| 2007/0262743 | A1  | 11/2007 | Kono et al. |                       |
|--------------|-----|---------|-------------|-----------------------|
| 2010/0237199 | A1* | 9/2010  | Jackson     | A63H 27/02<br>244/190 |
| 2011/0298343 | A1* | 12/2011 | Kim         | H05K 5/0008<br>312/223.6 |
| 2012/0325959 | A1* | 12/2012 | Jackson     | A63H 27/02<br>244/99.3 |

FOREIGN PATENT DOCUMENTS

| CN | 101716765 A | 6/2010 |
| CN | 103264389 A | 8/2013 |
| CN | 204815657 U | 12/2015 |
| JP | U1987015493 | 1/1987 |
| JP | A1993228677 | 9/1993 |
| JP | A2004009204 | 1/2004 |
| JP | 2011255367 A | 12/2011 |

* cited by examiner

*Primary Examiner* — Victor L Macarthur (57) ABSTRACT

The present invention discloses a robot joint structure that includes a servo and a connection part. The servo includes a servo main body and an output shaft, and one end of the output protruding out of the servo main body. The servo main body includes a servo plate at one side surface thereof. The servo plate is fixed to the output shaft and capable of rotating together with the output shaft. The connection part includes a first connection arm, and the first connection arm defines at least one connection chamber allowing the servo plate to be inserted therein and mating tightly with the servo plate, to fix the connection part to the servo plate. The servo and the connection part of the robot joint structure mate tightly with each other, which avoids the disengagement during rotation. The assembling process is simple, which enhances the user experience.

8 Claims, 9 Drawing Sheets

ROBOT JOINT STRUCTURE

CROSS REFERENCE TO RELATED APPLICATIONS

This application claims priority to Chinese Patent Application No. 201620505834.2, filed May 27, 2016, which is hereby incorporated by reference herein as if set forth in its entirety.

BACKGROUND

Field of the Invention

The present invention is directed to the field of robots, and particularly to a joint structure of a robot.

Description of the Related Art

Robots are machinery devices that perform corresponding actions according to control commands sent by control terminals. Some robots, like entertainment or humanoid robots, include joint structures that are used to construct feet, legs and elbows of robots. Each joint structure includes a servo and a connection part coupled to the servo. The connection part is rotatable around the servo. In some existing robot joint structures, the mating of the servo and the connection part is not tight, causing the connection part to tend to disengage from the servo during rotation. In addition, the assembling process of the connection part to the servo is complex, thereby affecting the user experience.

SUMMARY

A robot joint structure includes a servo and a connection part. The servo includes a servo main body and an output shaft, and one end of the output protrudes out of the servo main body. The servo main body includes a servo plate at one side surface thereof. The servo plate is fixed to the output shaft and capable of rotating together with the output shaft. The connection part includes a first connection arm, and the first connection arm defines at least one connection chamber allowing the servo plate to be inserted therein and mating tightly with the servo plate, to fix the connection part to the servo plate.

BRIEF DESCRIPTION OF THE DRAWINGS

The present invention will be further described in conjunction with the detailed description and the drawings. In the drawings.

The elements and corresponding reference numerals in the drawings: 10: servo; 110: servo main body; 120: output shaft; 130: servo plate; 131: column; 132: plate; 200: connection part; 210: first connection arm; 220: second connection arm; 230: third connection arm; 240 connection chamber; 241 bottom panel; 242: top panel; 2421: left portion; 2422: right portion; 2423: rear portion; 243: left panel; 244: right panel; 245: rear panel; 246: elongated slot; 247: fastening rib; 248: chamfer; 300: fastener assembly; 310: position-limit protrusion; 320: position-limit slot; 400: shaft structure; 410: first connection hole; 411: first position-limit recessed portion; 420: second connection hole; 421: second position-limit recessed portion; 430: connection pin; 431: pin main body; 432: protrusion; 433: claw; 4331: position-limit protrusion; 510: connection chamber; 520: connection plate; 530: third connection hole.

DETAILED DESCRIPTION

For a clearer understanding of the technical features, purpose and effect of the present invention, the specific embodiments of the present invention are now described in detail in conjunction with the drawings.

Figure 1:
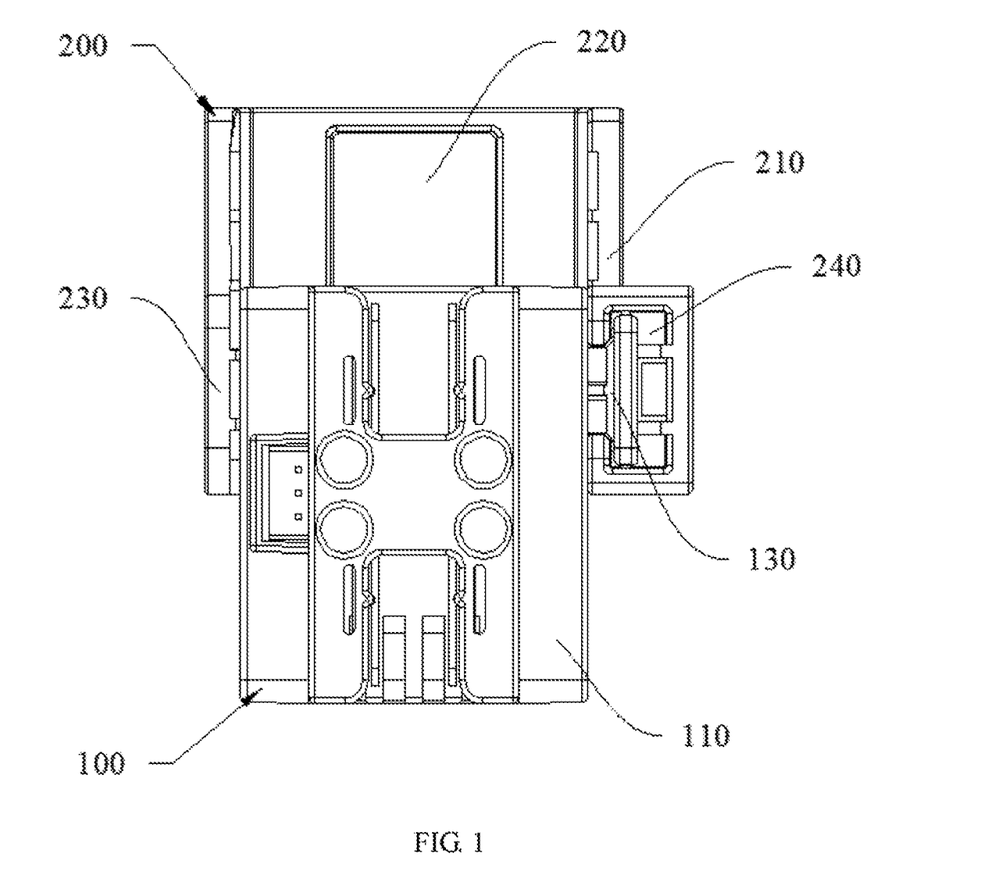
FIG. 1 is a planar view of a robot joint structure of one embodiment of the present invention.
Figure 2:
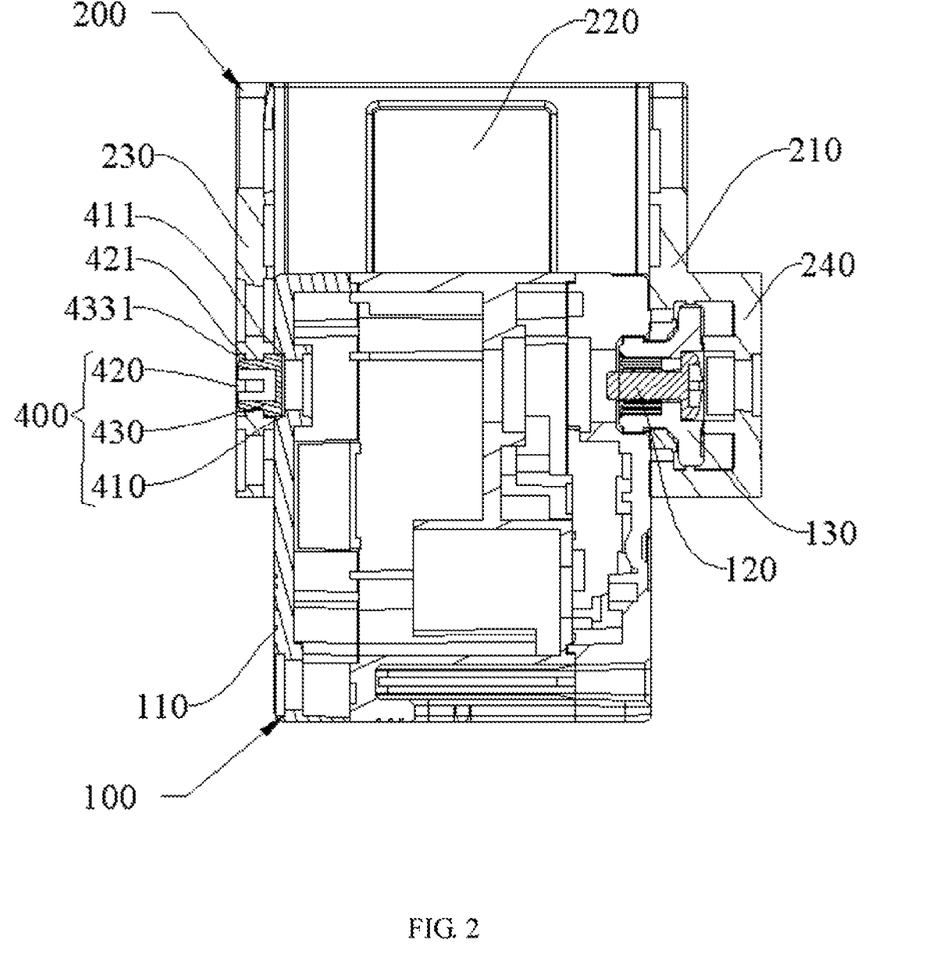
FIG. 2 is a sectional view of the robot joint structure shown in FIG. 1.
Figure 3:
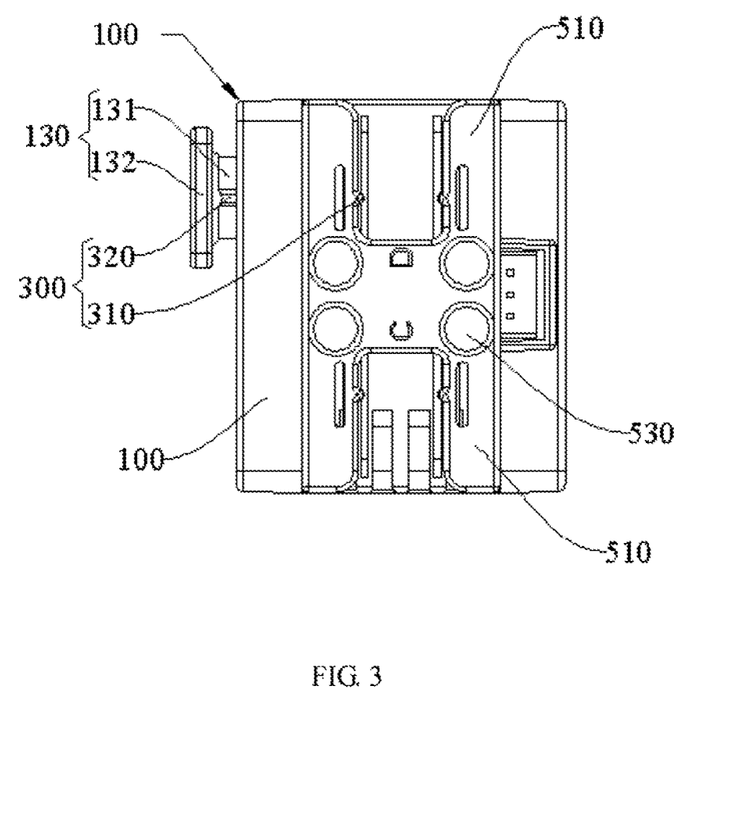
FIG. 3 is a planar view of a servo of the robot joint structure shown in FIG. 1.

FIGS. 1 and 2 show a robot joint structure according to one embodiment. The robot joint structure includes a servo 100 and a connection part 200 that is rotatable relative to the servo 100. The servo 100 includes a servo main body 110 and an output shaft 120. The output shaft 120 is arranged in the servo main body 110, and one end of the output shaft 120 protrudes out of the servo main body 110. It can be understood that the output shaft 120 is rotatable. A servo plate 130 is arranged at a side surface of the servo main body 110. In one embodiment, the servo plate 130 is arranged at the top surface of the servo main body 110. The servo plate 130 is fixed to the output shaft 120 and is rotatable together with the output shaft 120, that is, the output shaft 120 sets the servo plate 130 into rotation when the servo 100 is working. As shown in FIG. 3, the servo plate 130 has a T shaped longitudinal section and includes a column 131 and a plate 132 which are connected to each other. The shape of the plate 132 includes, but is not limited to, square. The shape of the column 131 includes, but is not limited to, cylinder.

Figure 4:
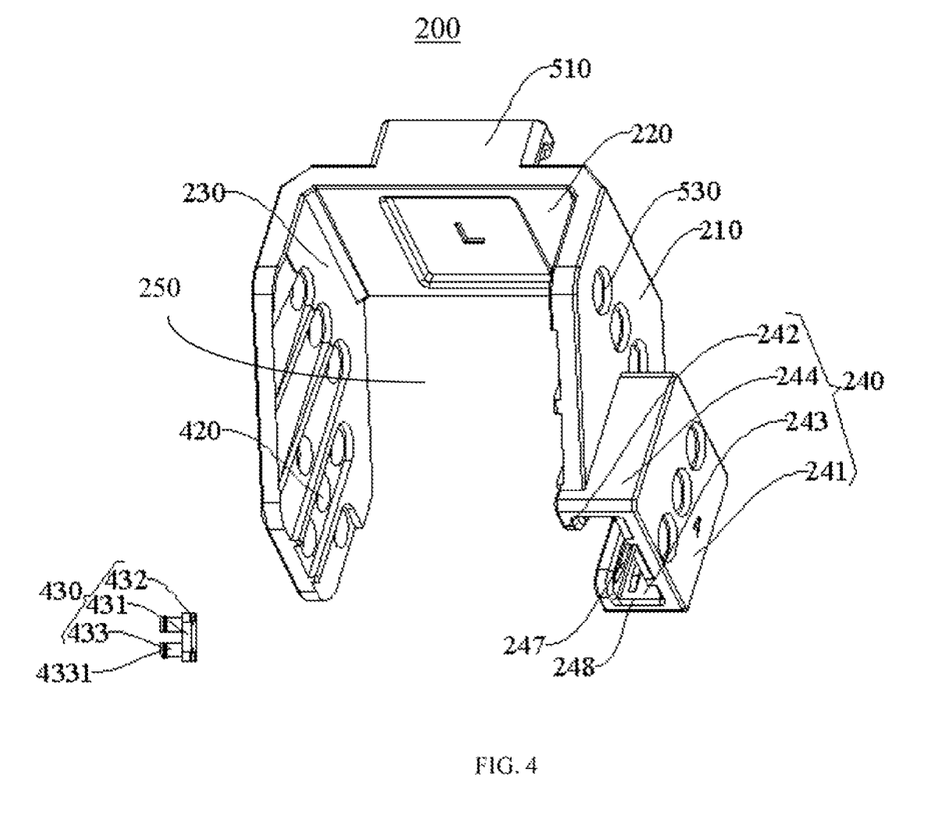
FIG. 4 is an isometric view of a connection part of the robot joint structure shown in FIG. 1.
Figure 5:
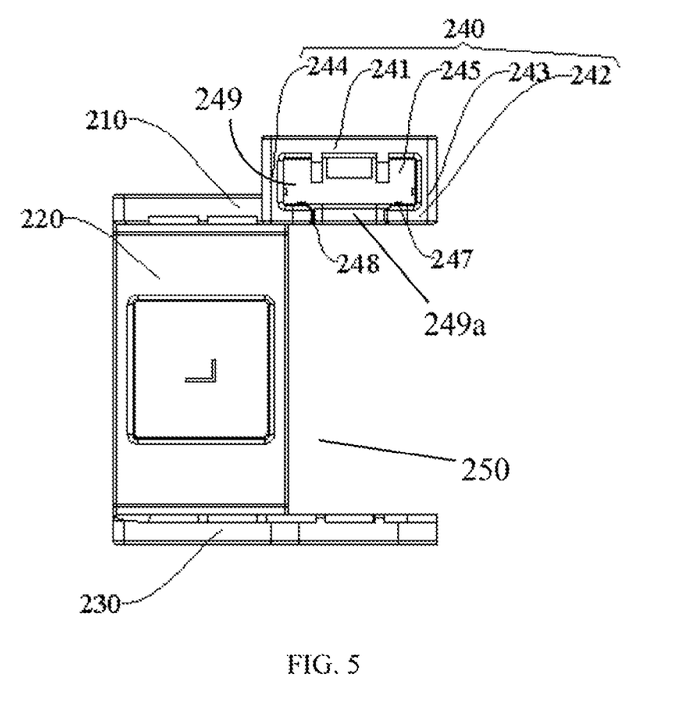
FIG. 5 is a front view of the connection part shown in FIG. 4.
Figure 6:
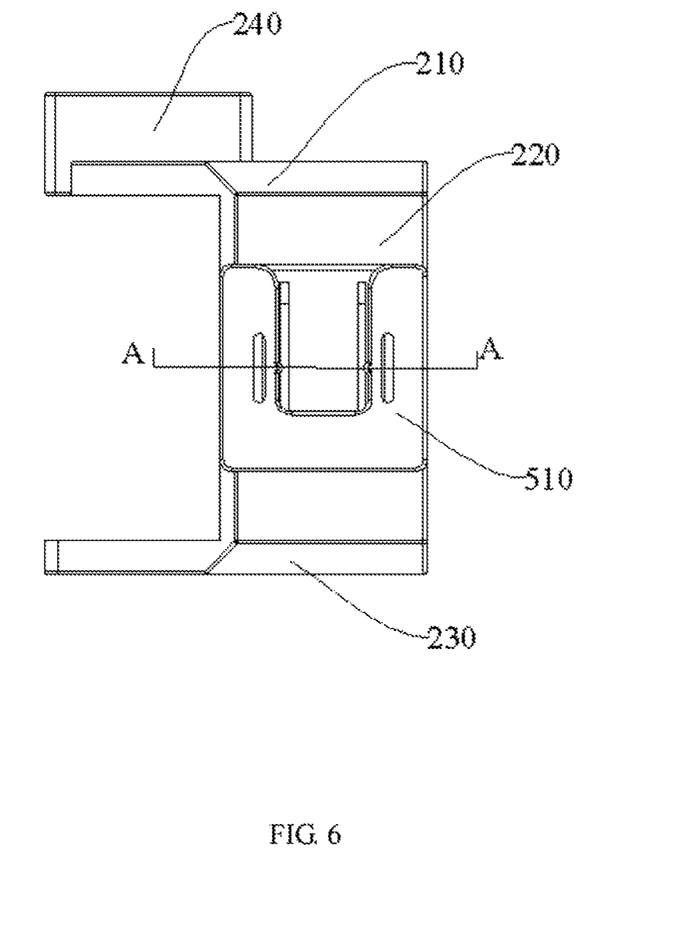
FIG. 6 is a rear view of the connection part shown in FIG. 4.
Figure 8:
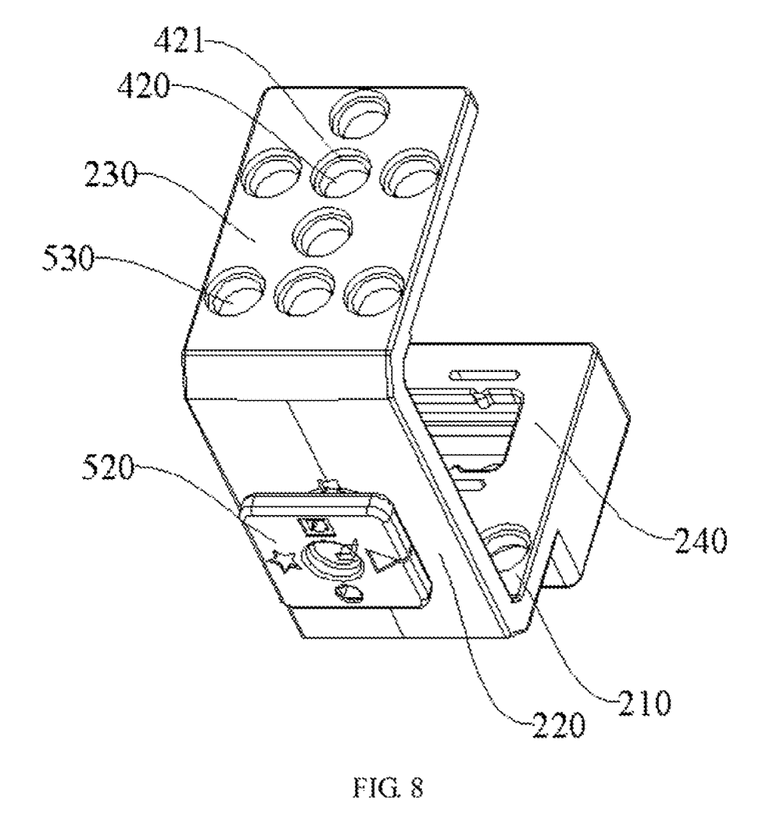
FIG. 8 is an isometric view of a connection part of a robot joint structure of another embodiment of the present invention.
Figure 9:
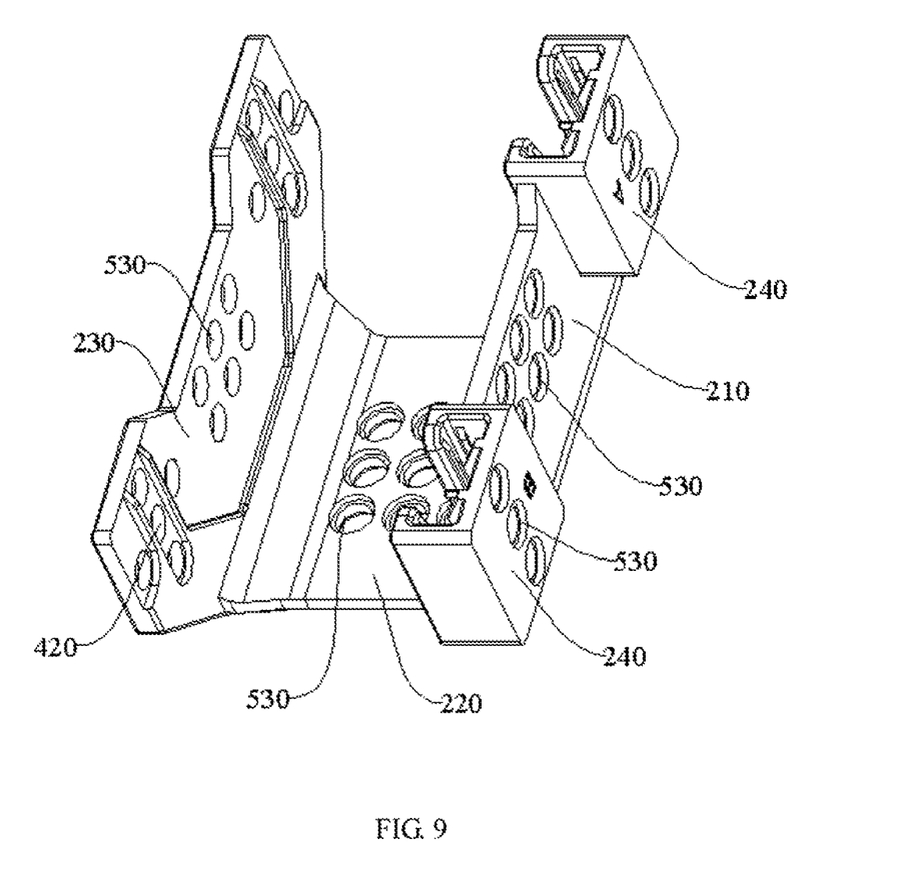
FIG. 9 is an isometric view of a connection part of a robot joint structure of yet another embodiment of the present invention.

As shown in FIGS. 4, 8 and 9, the connection part 200 includes a first connection arm 210, a second connection arm 220 and a third connection arm 230 that are integrally formed. The first and third connection arms 210 and 230 are arranged at opposite ends and at same side of the second connection arm 220 and extend outward. The first and third connection arms 210 and 230 are parallel to each other, causing the connection part 200 to resemble a U shape. The first and third connection arms 210 and 230 corporately define a space 250 to receive the servo main body 110 therein. It can be understood that the distance between the first and third connection arms 210 and 230 equals to the distance between the top surface and the bottom surface of the servo main body 110. The connection part 200 is made of material, such as plastic, that can be elastically deformed, thereby allowing, during the assembling of the robot joint structure, the servo 100 to be placed in the connection part 200 (shown in FIG. 2), and the connection part 200 to rotate relative to the servo 100. As shown in FIGS. 8 and 9, the first connection arm 210 and the third connection arm 230 are rectangular. As shown in FIG. 4, the first connection arm 210 and the third connection arm 230 may be hexagonal, and opposite edges of each of the hexagonal connection arms 210 and 230 are parallel to each other. It can be understood that the first connection arm 210 and the second connection arm may be other shapes. In one embodiment, the second connection arm 220 is rectangular and perpendicular to the first and third connection arms 210 and 230.

As shown in FIGS. 4 and 8, the first connection arm 210 defines a connection chamber 240 allowing one servo plate 130 to be inserted thereinto and tightly mating with the servo plate 130, thereby enabling the connection part 200 to mate with one servo 100. Thus, the assembling of one robot joint structure, i.e., one degree of freedom, is accomplished. As shown in FIG. 9, the first connection arm 210 may define two connection chambers 240 allowing two servo plates 130 to be inserted thereinto and tightly mating with the servo plates 130, thereby enabling the connection part 200 to mate with two servos 100. Thus, the assembling of a robot joint structure having two degrees of freedom is accomplished.

Figure 7:
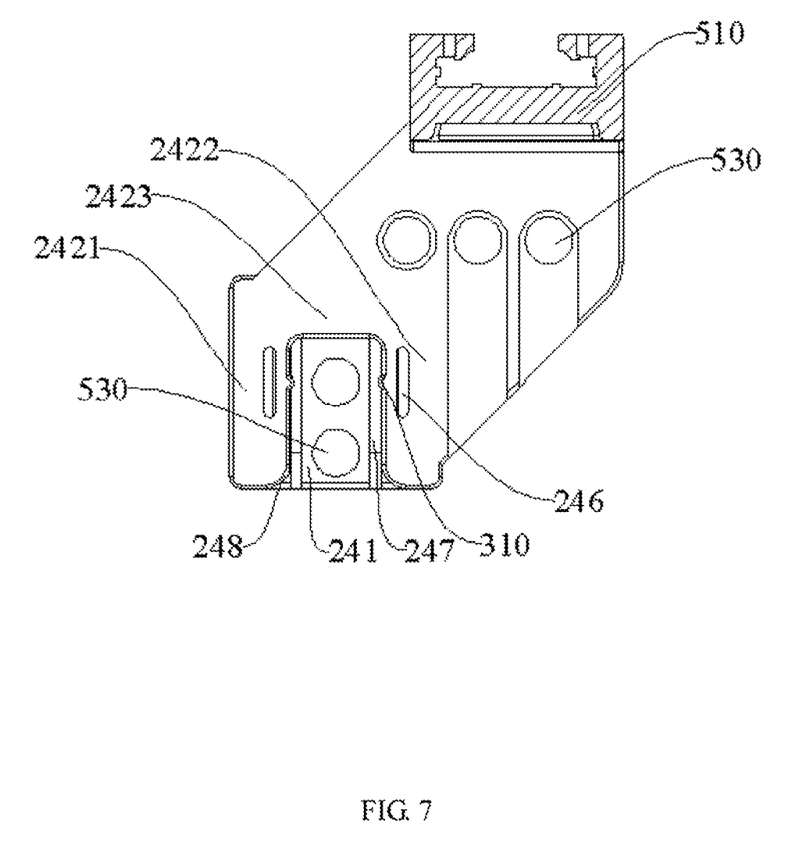
FIG. 7 is a sectional view along the line A-A of FIG. 6.

As shown in FIGS. 4 through 7, the connection chamber 240 includes a bottom panel 241, a top panel 242, a left panel 243, a right panel 244, and a rear panel 245. The bottom panel 241, the top panel 242, the left panel 243, the right panel 244, and the rear panel 245 corporately define a space 249 to receive the plate 132 of the servo plate 130. The top panel 242 defines an opening 249 allowing the servo plate 130 to be inserted thereinto. As shown in FIG. 7, the top panel includes a left portion 2421, a right portion 2422, and a rear portion 2423, forming a U shaped opening that allows the servo plate 130 to be inserted thereinto. The space 249 communicates with the space 205 through the opening 249a. Specifically, the width of the opening 249a matches the diameter of the column 131 of the servo plate 130 to achieve a tight mating. It can be understood that the top panel 242 of the connection chamber 240 in the first connection arm 210 are set to be flush with the inside surface of the first connection arm 210, i.e., the opening 249a of the top panel 242 is arranged in the inside surface of the first connection arm 210, thereby enabling the servo plate 130 of the servo 100 to be inserted into the connection chamber 240 of the first connection arm 210.

Specifically, the servo plate 130 and the connection chamber 240 are provided with a fastener assembly 300 for ensuring a tight connection between the servo plate 130 and the connection chamber 240. The space 249 of the chamber 240 is configured to prevent the plate 132 from moving in a first direction and a second direction, and the fastener assembly 300 is configured to prevent the column 131 from moving in a third direction, thereby fixing the servo plate 130 to the connection part 200. Specifically, the fastener assembly 300 is arranged at the column 131 of the servo plate 130 and the top panel 242 of the connection chamber 240. As shown in FIG. 3, the fastener assembly 300 includes a position-limit protrusion 310 and a position-limit slot 320. The opposite side edges of the opening 249a of the top panel each include one position-limit protrusion 310. That is, the inside side edges of the left portion 2421 and the right portion 2422 each include one position-limit protrusion 310 at corresponding positions. The column 131 includes position-limit slots 320 at opposite positions thereof. In one embodiment, there are four position-limit slots 320 defined in the column 131 aligning middle points of four side edges of the square plate 132, respectively. When the servo plate 130 is pushed into the connection chamber 240, the position-limit protrusions 310 snap into the position-limit slots 320 to play the role of fastening.

It can be understood that, when the servo plate 130 of the servo 100 is inserted into the connection chamber 240 of the first connection arm 210, the tight mating of the servo plate 130 and the connection part 200 is achieved through the mating of the position-limit protrusions 210 and the position-limit slots 320, which prevents the servo plate 130 from disengaging from the connection part 200 when the servo plate 130 drives the connection part 200 to rotate.

The left portion 2421 and the right portion 2422 of the top panel 242 each define an elongated slot 246. The elongated slots 246 are arranged parallel to the opposite side edges of the opening 249a of the top panel 242. The elongated slots 246 are arranged aligning the position-limit protrusions 310, thereby forming a deformable thin wall between the elongated slots 246 and the position-limit protrusions 310 and providing deformable space. When the servo plate 130 is being inserted into or being disengaged from the connection chamber 240, the position-limit protrusions 310 ride over the column 131, deform the thin wall, and are snappingly received into or disengaged from the position-limit slots 320.

As shown in FIGS. 4 through 7, the bottom panel 241, the top panel 242, the left panel 243 and the right panel 244 include at least one fastening rib 247. The extending direction of the fastening rib 247 and the extending direction of the opening 249a of the top panel 242 are the same. The arrangement of the fastening rib 247 is to guarantee the tightness of the mating between the servo plate 130 and the connection chamber 240, preventing the servo plate 130 from disengaging from the connection part 200 when the servo plate 130 drives the connection part 200 to rotate, and to make sliding of the plate 132 easy. In one embodiment, the bottom panel 241 includes two fastening ribs 247. The left portion 2421, the right portion 2422, the left panel 234 and the right panel 244 each include one fastening rib 247. The space defined by the six fastening ribs 247 match the plate 132 of the servo plate 130 in shape and size, to guarantee the tightness of the servo plate 130 inserted into the connection chamber 240, which avoid disengagement. Furthermore, the height of the fastening ribs 247 of the bottom panel 241 and the top panel 242 may be set to be different, according to the height of the connection chamber 240 of different needs.

Specifically, each fastening rib 247 includes a chamfer 248 at the end away from the rear panel 245. The top panel 242 includes chamfers 248 at the entrance of the opening 249a thereof, causing the entrance of the opening 249 of the connection chamber 240 to gradually become smaller for the ease of insertion of the servo plate 130. The chamfers can be sloping or round. It can be understood that the left portion 2421 and the right portion 2422 are provided with round chamfers at the entrance of the opening 249a of the top panel 242 for the ease of insertion of the servo plate 130.

The robot joint structure further includes a shaft structure 400. The third connection arm 230 is movably connected to the servo main body 110 via the shaft structure 400. The shaft structure 400 engages with a side surface of the servo main body 110 that is opposite to the servo plate 130 and is coaxial with the servo plate 130.

In one embodiment, the shaft structure 400 includes a first connection hole 410 defined in a side surface of the servo main body 110 and coaxial with the servo plate 130, a second connection hole 420 defined in the third connection arm 230, and a connection pin 430 detachably mounted in the second connection hole 420. It can be understood that during the assembling process of the robot joint structure, the first connection hole 410 and the second connection hole 420 are connected through the connection pin 430, and the connection pin 430 serves as a supporting point of the rotation between the first connection hole 410 and the second connection hole 420 when the connection part 200 rotates relative to the servo plate 130.

As shown in FIG. 2, the first connection hole 410 includes a first position-limit recessed portion 411 and the second connection hole 420 includes a second position-limit recessed portion 421. As shown in FIGS. 2 and 4, the connection pin 430 includes a pin main body 431, a protrusion 432 arranged on a side surface of the pin main body 431 and configured to be inserted into the first connection hole 410, and two claws 433 arranged on an opposite side surface of the pin main body 431 and each has a C shaped cross section. Each claw 433 includes a position-limit protrusion 4331 at one end. The position-limit protrusion 4331 mates with the second position-limit recessed portion 421 in the second connection hole 420. It can be understood that when assembling the robot joint structure, the C shaped position-limit protrusions 4331 are forced to deflect to enter the second connection hole 420 and then tightly engage with the second position-limit recessed portion 421. When the servo plate 130 is slid into the connection chamber 240, the protrusion 432 of the connection pin 430 rides over the side surface of the servo main body 110 and then snaps into the first position-limit recessed portion 411, which forms a supporting point, thereby achieving the tight mating of the first connection hole 410 and the second connection hole 420. The protrusion 432 may be cylindrical and is preferred to be short, just enough to support the connection part 200 to rotate relative to the servo 100 after assembly. The surface of the protrusion 432 may be a curved surface for easy assembling/disassembling.

It can be understood that, when assembling the robot joint structure, just inserting the servo plate 130 of the servo 100 into the connection chamber 240 of the connection part 200, with the protrusion 432 of the connection pin 430 mounted in the second connection hole 420 and inserted into the first connection hole 410. When the servo plate 130 drives the connection chamber 240 to rotate, the connection pin 430 and the servo plate 130 serve as a rotation shaft, causing the connection part 200 to be rotatable about the connection pin 430 and the servo plate 130. The assembling process is simple and convenient without using extra assembling tools, and undue disengagement does not tend to happen during rotation.

As shown in FIG. 4, the second connection arm 220 may further define another connection chamber 510, allowing the connection part 200 to be able to mate with other toy construction set block having a connection plate 520 or another servo having the servo plate 130. The mounting plate 520 and the servo plate 130 have the same specification and the connection chamber 510 and the connection chamber 240 have the same specification. The same specification used herein refers to the same shape and the same size, that is, the connection plate or the servo plate is able to mate with the connection chamber. As shown, in FIG. 8, the second connection arm 220 may further include a connection plate 130 having the same specification with the servo plate 130, allowing the connection part 200 to be able to mate with other construction set block having the connection chamber. As shown in FIG. 9, the second connection arm may further define a number of third connection holes 530. At least one end of each third connection hole 530 includes a position-limit recessed portion. It can mate with other toy construction set blocks through the third connection holes 530.

As shown in FIG. 3, at least one side surface of the servo main body 110 defines a connection chamber 510 having the same specification with the connection chamber 240, for mating with other toy construction set blocks that are provided with connection plate 520 or the servo plate 130. In one embodiment, the top surface of the servo main body 110 include the servo plate at one end. The bottom surface of the servo main body 110 defines the first connection hole 410 at a position opposite to the servo plate 130. The front surface and the rear surface of the servo main body 110 each define two connection chambers 510 facing opposite directions. The left side surface or the right side surface of the servo plate 130 defines one connection chamber 510.

As shown in FIGS. 4, 8 and 9, the servo main body 110, the first connection arm 210, the third connection arm 230 or the bottom panel 241 of the connection chamber 240 may define a number of third connection holes 530 that are able to connect with other toy construction set blocks. Specifically, the first connection hole 410, the second connection hole 420 and the first connection hole 530 have the same specification. The first connection hole 410, the second connection hole 420 and the third connection hole 530 are able to mate with the connection pin 430 or other toy construction set blocks.

In the robot joint structure of the present invention, the servo plate 130 of the servo 100 is inserted into the connection chamber 240 of the connection part 200. The third connection arm 230 is movably connected to the servo main body 110 through the shaft structure 400. The servo plate 130 is rotatable about the output shaft 120, thereby allowing the connection part having the connection chamber 240 to rotate about the output shaft 120 and the shaft structure 400. In the robot joint structure, the servo plate 130 and the connection chamber 240 are provided with the fastener assembly 300 for the tight mating of the servo plate 130 and the connection chamber 240. The first connection hole 410 mates with the second connection hole 420, tightly, through the connection pin 430, to achieve the tight mating of the servo 100 and the connection part 200, which avoids disengagement during rotation. In addition, when assembling the robot joint structure, just inserting the servo plate 130 into the connection chamber 240, with the connection pin 430 being inserted into the first connection hole 410. The assembling process is simple, thereby enhancing user experience.

In another embodiment, the shaft structure 400 includes a shaft hole or shaft protrusion that is arranged at one side surface of the servo main body 110 and is coaxial with the servo plate 130. Correspondingly, the third connection arm 230 includes a shaft protrusion or a shaft hole. The shaft hole and the shaft protrusion mate with each other to form a supporting point. The shaft hole may be a through hole or a blind hole. When assembling the robot joint structure, just inserting the servo plate 130 of the servo 100 into the connection chamber 240 of the connection part 200, with the shaft protrusion being inserted into the shaft hole. When the servo plate 130 drives the connection chamber 240 to rotate, the shaft protrusion and the servo plate serve as a rotation shaft, allowing the connection part 200 to rotate about the shaft protrusion and the servo plate 130. The assembling process is simple and convenient without using extra assembling tools. Disengagement does not tend to happen during rotation.

Compared with the existing technology, the present invention has the following advantages: In the robot joint structure of the present invention, the servo plate of the servo is inserted into the connection chamber of the connection part. The third connection arm is movably connected to the servo main body through the shaft structure. The servo plate is rotatable about the output shaft, thereby allowing the connection part having the connection chamber to rotate about the output shaft and the shaft structure. In the robot joint structure, the tight mating of the servo and the connection part is achieved through the tight mating of the servo plate and the connection chamber, which avoids disengagement during rotation. In addition, when assembling the robot joint structure, just inserting the servo plate into the connection chamber, with the shaft structure mated with each other. The assembling process is simple, thereby facilitating the enhancing of user experience.

The present invention has been described by way of the above embodiments. One skilled in the art will realize that various changes or equivalents may be made to the present invention without departing from the spirit and scope of the present invention. Further, modifications can be made to the present invention to adapt a particular situation or material without departing from the spirit and scope of the invention. Accordingly, the present invention is not limited to the embodiment(s) disclosed herein, and all embodiments falling within the scope of the claims of this application are covered in the protection scope of the present invention.

What is claimed is:

1. A robot joint structure comprising:
   a servo comprising a servo main body and an output shaft, the output shaft comprising one end protruding out of the servo main body, and a servo plate being fixed to the output shaft and rotatable together with the output shaft; and
   a connection part comprising a first connection arm, and the first connection arm defining at least one connection chamber allowing the servo plate to be inserted thereinto and mating tightly with the servo plate, to fix the connection part to the servo plate;
   wherein the connection part further comprises a second connection arm and a third connection arm, the first connection arm and the third connection arm are arranged at opposite ends and at a same side of the second connection arm and extend outward, the first connection arm and the third connection arm corporately define a first space to receive the servo main body therein;
   the servo plate comprises a column and a plate that are connected to each other, and the connection chamber comprises a second space for receiving the plate and an opening for receiving the column, the second space communicates with the first space through the opening;
   the servo plate and the connection chamber are provided with a fastener assembly, the second space of the chamber is configured to prevent the plate from moving in a first direction and a second direction, and the fastener assembly is configured to prevent the column from moving in a third direction, thereby fixing the servo plate to the connection part;
   the connection chamber comprises a bottom panel, a top panel, a left panel, a right panel and a rear panel, the bottom panel, the top panel, the left panel, the right panel and the rear panel form the second space, the top panel defines the opening therein, and the fastener assembly is arranged at the column and the top panel.

2. The robot joint structure of claim 1, wherein the bottom panel, the top panel, the left panel and the right panel each comprise at least one fastening rib, the fastening ribs extend in a direction that is the same with the extending direction of the opening of the top panel.

3. The robot joint structure of claim 1, wherein the fastening rib comprises a chamfer at an end away from the rear panel, the top panel comprises chambers at an entrance of the opening thereof.

4. The robot joint structure of claim 1, wherein the first connection arm and the third connection arm are hexagonal, and opposite side edges of the hexagonal first connection arm and third connection arm are parallel to each other.

5. The robot joint structure of claim 1, wherein the second connection arm comprises a connection chamber, a connection plate or a third connection hole, the servo main body defines the connection chamber in at least one side surface thereof, the connection chamber has a specification the same as the connection chamber, and the third connection hole has a specification the same as the first connection hole or the second connection hole.

6. The robot joint structure of claim 5, wherein the servo main body, the first connection arm, the third connection arm or the connection chamber defines a plurality of the third connection holes.

7. The robot joint structure of claim 1, wherein the fastener assembly comprises a position-limit protrusion and a position-limit slot that are configure to mate with each other, the top panel comprises one position-limit protrusion on a side edge of the opening thereof, and the column defines a position-limit slot.

8. The robot joint structure of claim 7, wherein the top panel comprises a left portion, a right portion and a rear portion, the left portion and the right portion each comprise one position-limit protrusion at opposite positions, the left portion and the right portion each defines an elongated slot, the elongated slots extend in a direction parallel to opposite edges of the opening of the top panel, and are arranged aligning the position-limit protrusions.

* * * * *